United States Patent
Durkee

(10) Patent No.: US 8,912,743 B2
(45) Date of Patent: Dec. 16, 2014

(54) APPARATUS AND METHOD OF DETERMINING ROTOR POSITION IN A SALIENT-TYPE MOTOR

(75) Inventor: Scott Robert Durkee, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 483 days.

(21) Appl. No.: 13/286,591

(22) Filed: Nov. 1, 2011

(65) Prior Publication Data

US 2013/0106333 A1 May 2, 2013

(51) Int. Cl.
*H02P 1/04* (2006.01)
*H02P 6/18* (2006.01)

(52) U.S. Cl.
CPC ...................... *H02P 6/186* (2013.01)
USPC ................. 318/400.33; 318/400.01

(58) Field of Classification Search
USPC .................... 318/811, 599, 500, 459, 400.32, 318/400.33, 400.34
See application file for complete search history.

(56) References Cited

U.S. PATENT DOCUMENTS

| | | | | |
|---|---|---|---|---|
| 4,740,738 | A * | 4/1988 | El-Antably et al. | 318/701 |
| 6,414,462 | B2 * | 7/2002 | Chong | 318/701 |
| 6,788,024 | B2 * | 9/2004 | Kaneko et al. | 318/807 |
| 6,885,970 | B2 * | 4/2005 | Petrovic et al. | 702/169 |
| 7,015,664 | B2 * | 3/2006 | Coles et al. | 318/400.01 |
| 7,180,263 | B2 * | 2/2007 | Maeda et al. | 318/719 |
| 8,203,293 | B2 * | 6/2012 | Ohgushi | 318/400.02 |
| 2001/0030517 | A1 | 10/2001 | Batzel | |
| 2006/0132075 | A1 | 6/2006 | Lee et al. | |
| 2010/0148710 | A1 | 6/2010 | Lim et al. | |

OTHER PUBLICATIONS

Dal Y. Ohm et al, About Commutation and Current Control Methods for Brushless Motors, Jul. 26-29, 1999, 11 pgs, 29th Annual IMCSD Symposium, San Jose, CA.

Jianwen Shao, Direct Back EMF Detection Method for Sensorless Brushless DC (BLDC) Motor Drives, Thesis submitted to the Virginia Polytechnic Institute and the State University, Sep. 2003, 91 pgs.

Jun Kang, Ph.D, Sensorless Control of Permanent Magnet Motors With internal permanent magnet motors, the high frequency signal injection method can deliver precise speed control without the need for a feedback sensor, Control Engineering, Apr. 2010, 4 pgs, vol. 57 No. 4, Reed Business Information.

Jose Carlos Gamazo-Real et al., Position and Speed Control of Brushless DC Motors Using Sensorless Techniques and Application Trends, Sensors, Jul. 19, 2010, vol. 10, pp. 6901-6947.

Juan W. Dixon, et al.: "Simplified Sensorless Control for BLDC Motor, Using DSP Technology"; 2002; pp. 1431-1442.

* cited by examiner

*Primary Examiner* — Rina Duda
(74) *Attorney, Agent, or Firm* — Cantor Colburn LLP

(57) ABSTRACT

An example apparatus includes a controller configured to control operation of a salient-type, multiphase motor in accordance with a technique including periodic on and off-times, the motor including a stator and a rotor. The controller is configured to calculate or receive values representing changes in current to the motor during the respective on and off-times or measurements proportional thereto, and calculate an inductance of the motor as a function of the values and a supply voltage to the motor. And the controller is configured to determine a position of the rotor based on the inductance of the motor, and control operation of the motor based on the position of the rotor.

21 Claims, 6 Drawing Sheets

APPARATUS AND METHOD OF DETERMINING ROTOR POSITION IN A SALIENT-TYPE MOTOR

TECHNICAL FIELD

Example embodiments of the present invention generally relate to determining rotor position in a salient-type motor and, more particularly, relate to measuring phase-winding inductance in a salient-type motor to determine rotor position based thereon.

BACKGROUND

A brushless direct current (BLDC) motor is a type of permanent magnet synchronous motor powered by direct current, as its name suggests. The BLDC motor generally includes a moving rotor with permanent magnets and a stationary stator that includes windings of wire into which a voltage is induced as the magnets pass over them. One common configuration of BLDC motor is the three-phase configuration in which the stator has three windings.

The BLDC motor generally operates by electronic commutation in which the BLDC motor is driven according to a commutation sequence. In a three-phase BLDC motor, for example, each step of the commutation sequence includes one winding energized positive (current entering) and another winding energized negative (current exiting), while the third winding is not used (non-energized). Driving two of the three windings generates a magnetic field in the stator windings and the rotor magnets, which produces torque that causes the rotor to rotate. To keep the rotor rotating, the sequence moves to a next step for another winding pair to shift the position of the magnetic field produced by the windings. For a three-phase BLDC motor including phases A, B and C each of which is separated by adjacent phases by 120°, one example commutation sequence may include the following six steps AB-AC-BC-BA-CA-CB.

Many BLDC motors are driven by an inverter (e.g., three-phase inverter) and require the position of the rotor to apply the proper commutation sequence. The rotor position may be obtained in a number of different manners. In one common manner, the BLDC motor includes a position sensor, such as a Hall-effect sensor, that directly senses the position of the rotor. Other BLDC motors operate by sensorless control in which the position of the rotor is estimated using other motor parameters. In one common sensorless control technique, the position of the rotor is estimated using back electromotive force (EMF) generated in the non-energized winding during operation.

Whereas the back-EMF measurement technique is adequate for estimating the position of the rotor, the technique has it limits. The magnitude of the back-EMF generated in the non-energized winding is proportional to the speed of the motor. In a number of instances in which the motor is stationary or rotating at low speed, the quality of the back-EMF measurement (e.g., signal-to-noise ratio) may be too low to effectively estimate the position of the rotor.

BRIEF SUMMARY

Example embodiments of the present invention provide an improved apparatus, method and computer-readable storage medium for controlling operation of a salient-type, multiphase motor such as a BLDC motor. According to one example embodiment, an apparatus is provided that includes a controller configured to control operation of a salient-type, multiphase motor in accordance with a technique including periodic on and off-times, and in which the motor including a stator and a rotor. The controller is configured to calculate or receive values representing changes in current to the motor during the respective on and off-times or measurements proportional thereto. In one example, the values may be received and represent the measurements proportional to the changes in current to the motor during the respective on and off-times, with the measurements being of voltages from a differentiator circuit.

In another example, operation of the motor is controlled in accordance with a pulse width modulation (PWM) technique including periodic PWM high and low-times corresponding to the periodic on and off-times. In this example, the values may be calculated and represent changes in current during the respective PWM high and low-times. The PWM technique may include receiving measurements of current to the motor during the respective PWM high and low-times. And in this example, second measurements of current to the motor during the respective PWM high and low-times may be received. Calculation of the values may then include calculating the changes in current to the motor during the respective PWM high and low-times as function of the measurements and second measurements.

The stator may include a plurality of windings for a plurality of phases of the motor, and operation of the motor is controlled according to a commutation sequence including a plurality of steps each of which include periodic on and off-times, and during each of which the windings of a pair of the phases of the motor are energized. During at least one step of the commutation sequence, then, the values may represent changes in current through the windings of a respective pair of phases during the respective on and off-times or measurements proportional thereto.

The controller is also configured to calculate an inductance of the motor as a function of the values and a supply voltage to the motor. For example, the controller may be configured to calculate the inductance L of the motor according to the following:

$$L = \frac{2V_{DC}}{\left(\left|\frac{di}{dt}\right| + \left|\frac{di_1}{dt_1}\right|\right)}$$

in which $$\frac{di}{dt} \text{ and } \frac{di_1}{dt_1}$$

represent the changes in current during the respective on and off-times, and $V_{DC}$ represents the supply voltage to the motor.

The controller is further configured to determine a position of the rotor based on the inductance of the motor, and control operation of the motor based on the position of the rotor. And in one example, the controller may be configured to selectively determine the position of the rotor based on the inductance of the motor, or a back electromotive force generated in the motor, based on a speed of the motor.

BRIEF DESCRIPTION OF THE DRAWINGS

Figure 1:
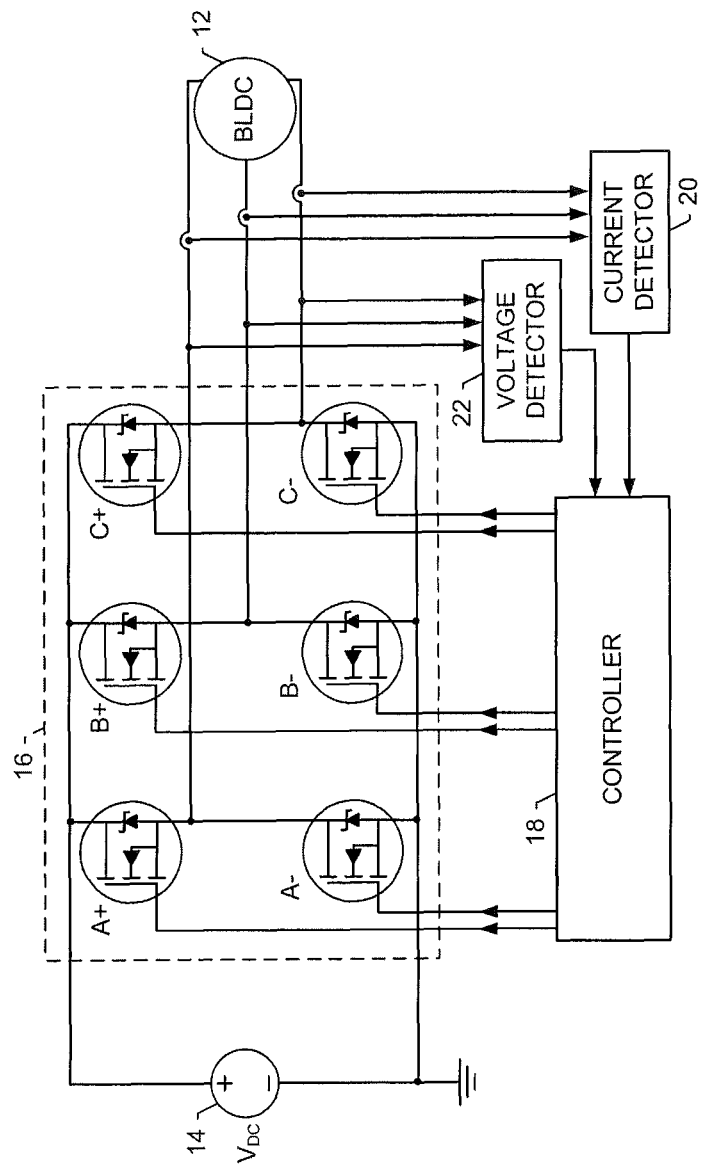
Figure 3A:
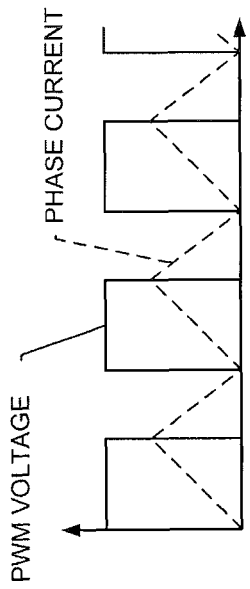
Figure 3B:
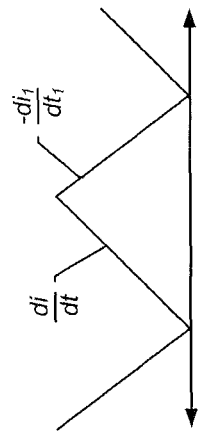
Figure 2:
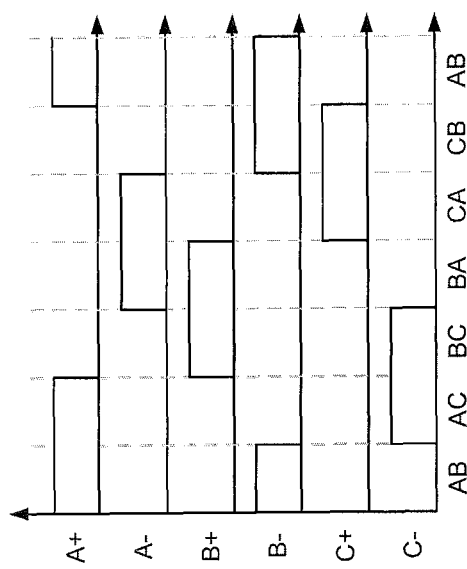
Figure 5A:
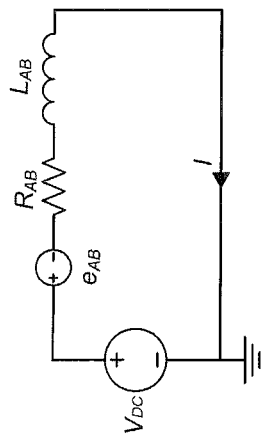
Figure 5B:
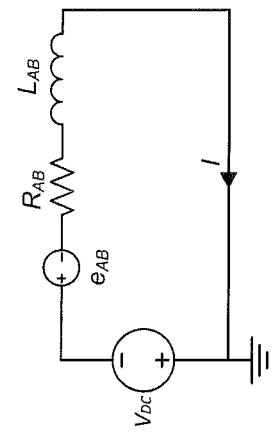
Figure 4:
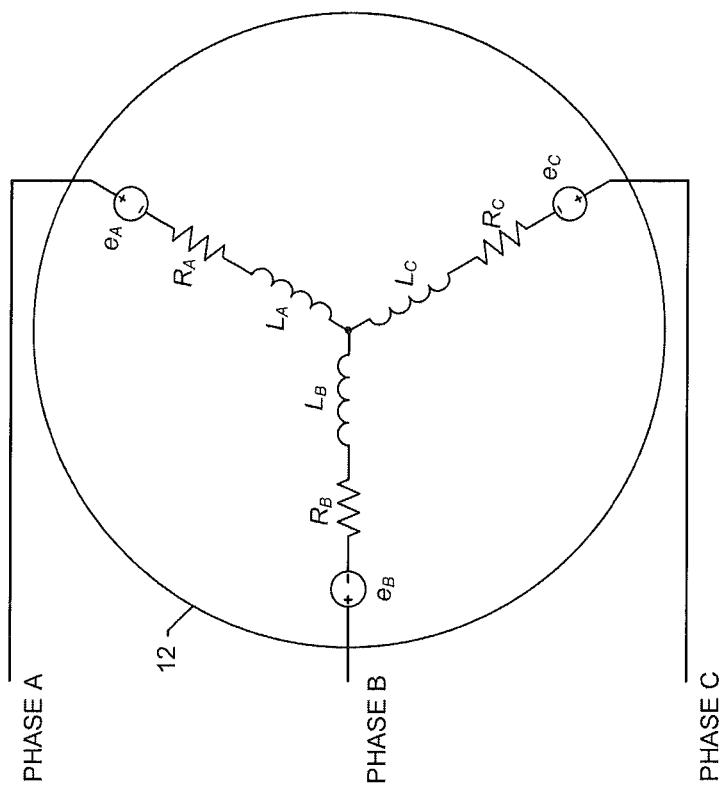
Figure 6:
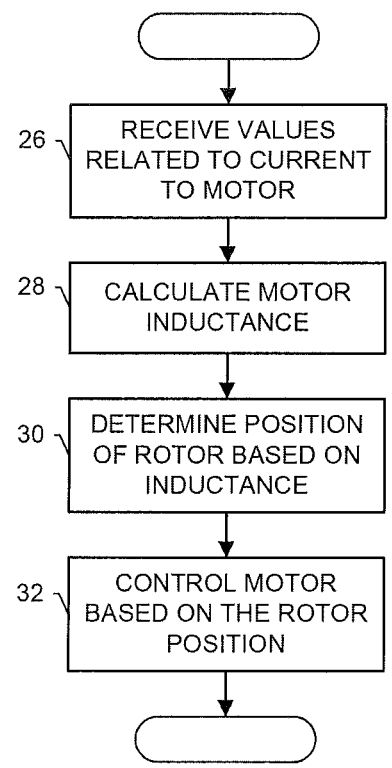
Figure 7:
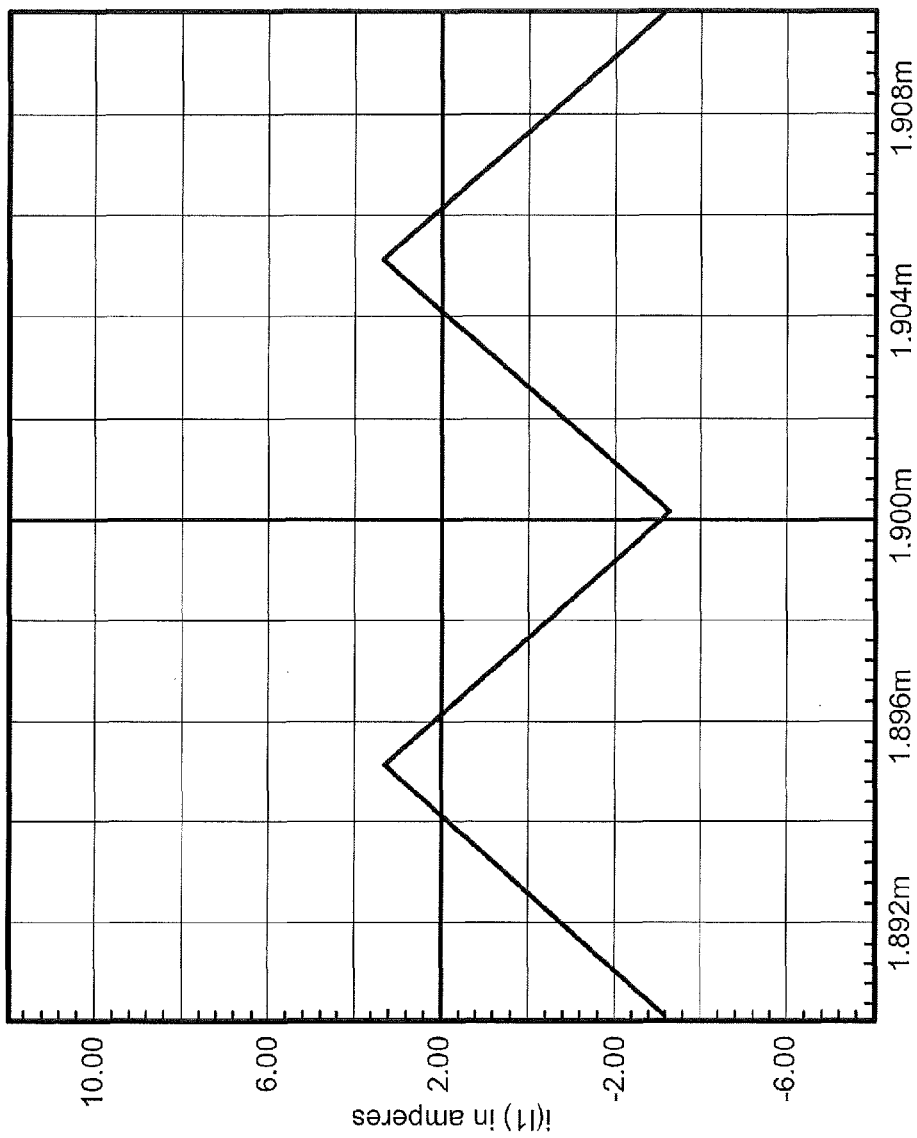
Figure 8:
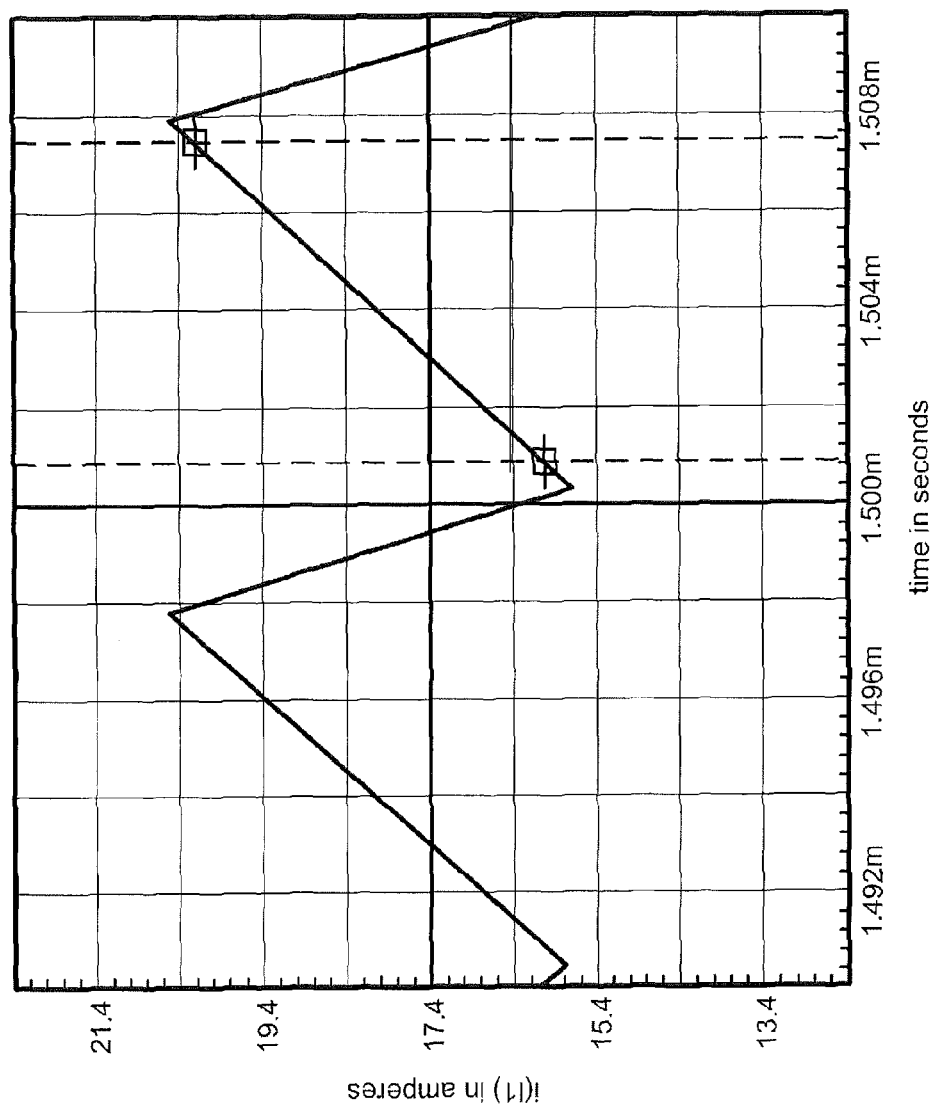

Having thus described the invention in general terms, reference will now be made to the accompanying drawings, which are not necessarily drawn to scale, and wherein:

FIG. 1 is a block diagram of an apparatus for controlling a salient-type, three-phase BLDC motor according to various example embodiments of the present invention;

FIG. 2 is a graph illustrating one example commutation sequence according to which the motor of FIG. 1 may be controlled, according to example embodiments of the present invention;

FIG. 3a illustrates one example of a PWM voltage waveform and its corresponding phase current waveform, and FIG. 3b illustrates changes in phase current over PWM high and low-times, according to example embodiments of the present invention;

FIG. 4 illustrates an example circuit model of the motor of FIG. 1, according to example embodiments of the present invention;

FIGS. 5a and 5b illustrate example equivalent circuits during positive energizing of phase A and negative energizing of phase B (AB) during PWM high and low-times, respectively, according to example embodiments of the present invention;

FIG. 6 is a flowchart illustrating various operations in a method of example embodiments of the present invention; and FIGS. 7 and 8 are graphs of PWM phase current waveforms according to example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. Reference may be made herein to terms specific to a particular system, architecture or the like, but it should be understood that example embodiments of the present invention may be equally applicable to other similar systems, architectures or the like.

Example embodiments of the present invention generally relate to determining rotor position in a salient-type motor such as a three-phase BLDC motor to thereby permit application of a proper commutation sequence. As explained below, example embodiments may determine the rotor position by measuring phase-winding inductance in the motor, and determine the rotor position based on a known relationship between the motor inductance and rotor position. In this regard, as described herein, a "salient-type" motor is characterized by a phase-winding inductance that varies with the rotor position. The method of measuring the phase-winding inductance according to example embodiments is not dependent on motor speed, and accordingly, may determine the rotor position of a motor that is stationary or rotating at low speed.

FIG. 1 depicts an apparatus 10 for controlling a salient-type, three-phase BLDC motor 12 according to various example embodiments of the present invention, the motor as illustrated including phases A, B and C each of which is separated by adjacent phases by 120°. The apparatus includes a direct current (DC) voltage source 14 for supplying a DC voltage (supply voltage) $V_{DC}$ to an inverter 16. In one example, the DC voltage source may be provided by a rectifier for converting alternating current (AC) voltage from an AC power supply into. The inverter of the illustrated example embodiment is a three-phase inverter that includes three pairs of switching elements for switchably energizing the three phases of the motor in accordance with a commutation sequence driven by a controller 18.

The controller 18 may be embodied as or otherwise include any of a number of different means for performing the functions described herein. For example, the controller may be embodied as or otherwise include one or more microprocessors, coprocessors, controllers, special-purpose integrated circuits such as, for example, application specific integrated circuits (ASICs), field programmable gate arrays (FPGAs), digital signal processors (DSPs), hardware accelerators, processing circuitry or other similar hardware. Additionally or alternatively, for example, the controller may include one or more transistors, logic gates, a clock (e.g., oscillator) or other circuitry. Further for example, the controller may include one or more memory devices (e.g., non-volatile memory, volatile memory) configured to store instructions for execution by the controller for performing one or more of its functions.

In the example shown, each step of the commutation sequence includes energizing one phase winding positive (current entering) and energizing another winding negative (current exiting), while the third winding is not used (non-energized). The pairs of switching elements therefore include, for each phase, a switching element to energize the phase positive and a switching element to energize the phase negative. As shown, then, the pairs of switching elements include elements A+ and A− for phase A, elements B+ and B− for phase B, and elements C+ and C− for phase C.

In the BLDC motor 12, driving two of the three windings generates a magnetic field in the stator windings and the rotor magnets, which produces torque that causes the rotor to rotate. To keep the rotor rotating, the sequence moves to a next step for another winding pair to shift the position of the magnetic field produced by the windings. As shown in FIG. 2, one example commutation sequence may include the following six steps AB-AC-BC-BA-CA-CB (in each pair, the first phase energized positive and the second phase energized negative).

The speed of the BLDC motor 12 may be directly proportional to the voltage (and current) applied to its phase windings. In addition to controlling the commutation sequence, then, the controller 18 may additionally control the speed of the motor by controlling the phase voltages (and currents), such as in accordance with a pulse width modulation (PWM) technique. In accordance with PWM, the controller may turn the appropriate switching elements in a given commutation step on (PWM high) and off (PWM low) at a particular frequency to achieve a desired average voltage (and current). The longer the switch is on relative to off (the larger the duty cycle), the higher the average voltage (and current) applied to the phase windings. To implement this technique, the apparatus 10 may further include a current detector 20 configured to measure the phase currents, which may supply feedback for the PWM control. In this regard, FIG. 3a illustrates one example of a PWM voltage waveform and its corresponding phase current waveform.

Referring now to FIG. 4, the BLDC motor 12 may be modeled as a circuit including, for each phase, a phase-winding (or stator) resistance and inductance, and back (or counter) electromotive force (EMF) voltage generated in each phase winding as the rotor rotates. In the illustrated example, the phase windings may have respective resistances $R_A, R_B, R_C$, inductances $L_A, L_B, L_C$ and back EMFs $e_A, e_B, e_C$.

During each step of the commutation sequence, the apparatus 10 may be represented by an equivalent circuit represented by the applied voltage $V_{DC}$ and the circuit model of the pair of phase windings energized positive and negative. And more particularly, in instances in which the controller 18 applies PWM control, the apparatus may be represented by two equivalent circuits for the PWM high and low-times. FIGS. 5a and 5b illustrate example equivalent circuits during positive energizing of phase A and negative energizing of phase B (AB), with FIG. 5a representing the equivalent circuit during PWM high-times, and FIG. 5b representing the equivalent circuit during PWM low-times. As illustrated $R_{AB}$, $L_{AB}$ and $e_{AB}$ represent the resistance, inductance and back EMF of the phase-winding pair, respectively. Although not separately illustrated, the resistance $R_{AB}$ may additionally include a resistance attributable to the inverter switching elements for the respective pair.

To properly apply the commutation sequence, the controller 18 may require the position of the rotor of the BLDC motor 12. In a salient-type motor, the phase-winding inductance varies with the rotor position in a known manner. Example embodiments of the present invention may therefore determine the rotor position by measuring phase-winding inductance in the motor, and determine the rotor position based on the known relationship between the motor inductance and rotor position. As indicated above, the method of measuring the phase-winding inductance according to example embodiments is not dependent on motor speed, and accordingly, may determine the rotor position of a motor that is stationary or rotating at low speed.

During a PWM high-time and a PWM low-time, the equivalent circuit of the apparatus 10 as shown in FIG. 5a may be respectively represented as follows:

$$V_{DC} - I \times R_{AB} - L_{AB} \times \left(\frac{di}{dt}\right) - e_{AB} = 0 \quad (1)$$

$$V_{DC} + I \times R_{AB} + L_{AB} \times \left(\frac{di_1}{dt_1}\right) + e_{AB} = 0 \quad (2)$$

In the preceding, $$\frac{di}{dt}$$

represents the change in phase current over the PWM high-time, and $$\frac{di_1}{dt_1}$$

represents the change in phase current over the PWM low-time, as illustrated for example in FIG. 3b.

Equations (1) and (2) may be rearranged as follows:

$$L_{AB} \times \left(\frac{di}{dt}\right) = V_{DC} - I \times R_{AB} - e_{AB} \quad (3)$$

$$-L_{AB} \times \left(\frac{di_1}{dt_1}\right) = V_{DC} + I \times R_{AB} + e_{AB} \quad (4)$$

Equations (3) and (4) may then be added and solved for the phase-winding inductance $L_{AB}$ as follows:

$$L_{AB} = \frac{2V_{DC}}{\left(\frac{di}{dt} - \frac{di_1}{dt_1}\right)} \quad (5)$$

And because $$\frac{di_1}{dt_1}$$

during the PWM low-time is always negative, the phase winding inductance may be simplified as follows:

$$L_{AB} = \frac{2V_{DC}}{\left(\left|\frac{di}{dt}\right| + \left|\frac{di_1}{dt_1}\right|\right)}$$

which may be further generalized as an inductance of the motor L.

The controller 18 of example embodiments of the present invention may therefore receive measurements of the voltage VDC and current changes $$\frac{di}{dt} \text{ and } \frac{di_1}{dt_1},$$

and calculate the phase winding inductance of a pair of phase windings as a function of the respective values, such as in accordance with equation (6). The controller may determine the position of the rotor of the BLDC motor 12 based on the calculated inductance and known relationship between the inductance and rotor position. The controller may then apply the appropriate commutation sequence based on the determined rotor position.

The controller 18 may receive the requisite measurements in a number of different manners. In one example, the apparatus 10 may include a voltage detector 22 configured to detect or otherwise measure the voltage $V_{DC}$, and supply the voltage to the controller 18.

As explained above, the current detector 20 of the apparatus 10 may be configured to utilize the phase currents to implement PWM control. Additionally, in accordance with example embodiments of the present invention, the current detector may be additionally configured to obtain a second current sample during each of the PWM high-time and low-time, which may permit the controller 18 to calculate the changes in current (slopes) over the PWM high and low-times, $$\frac{di}{dt} \text{ and } \frac{di_1}{dt_1}.$$

In this regard, the controller may utilize the PWM period and duty cycle (known from its PWM control) to automatically adjust the sample times of the current detector and thereby acquire the two current samples during each of the PWM high and low-times.

In one example embodiment, the apparatus 10 may further include a differentiator circuit configured to receive the phase current from the current detector 20 and produce a voltage proportional $$\frac{di}{dt} \text{ and } \frac{di_1}{dt_1}$$

during the PWM high and low-times, which may then be supplied to the controller 18. In this example embodiment, the controller may receive only one sample (from the differentiator) for each high-time and low-time, as opposed to the two samples. Likewise, the controller of this example embodiment need not calculate the current change as the voltage from the differentiator is already proportional to the change.

As will be appreciated, the inductance measurement technique of example embodiments of the present invention may be particularly useful in instances in which the rotor is stationary or rotating at a low speed, which may require less computing resources to calculate the changes in phase current, and thus the motor inductance. Conversely, other techniques for determining the rotor position, such as the back-EMF measurement technique, are more useful in instances in which the rotor is rotating at a high speed, which produces a higher back EMF in the non-energized phase winding. Example embodiments of the present invention may therefore be capable of implementing multiple techniques for determining the rotor position, and be configured to switchably implement the different techniques based on factors such as the speed of the rotor. At stationary and lower speeds, the controller 18 may be configured to implement the inductance measurement technique, and at higher speeds, the controller may be configured to switch to and implement the back-EMF measurement technique. In these instances, the same or another voltage detector 22 may be configured to detect or otherwise measure the back EMF in one or more of the windings, such as the non-energized winding during each step of the commutation sequence.

Reference is made to FIG. 6, which presents a flowchart illustrating various operations that may be performed by the controller 18 to control operation of a salient-type, multiphase motor in accordance with a technique including periodic on and off-times according to example embodiments of the present invention, and in which the motor includes a stator and a rotor. As shown, the operations may include calculating or receiving values representing changes in current to the motor during the respective on and off-times or measurements proportional thereto, as shown in block 26. In one example, the values may be received and represent the measurements proportional to the changes in current to the motor during the respective on and off-times, with the measurements being of voltages from a differentiator circuit.

In another example, operation of the motor is controlled in accordance with a pulse width modulation (PWM) technique including periodic PWM high (on) and low (off) times. In this example, the values may be calculated and represent changes in current during the respective PWM high and low-times. The PWM technique may include receiving measurements of current to the motor during the respective PWM high and low-times. And in this example, second measurements of current to the motor during the respective PWM high and low-times may be received. Calculation of the values may then include calculating the changes in current to the motor during the respective PWM high and low-times as function of the measurements and second measurements.

The stator may include a plurality of windings for a plurality of phases of the motor, and operation of the motor is controlled according to a commutation sequence including a plurality of steps each of which include periodic on and off-times, and during each of which the windings of a pair of the phases of the motor are energized. During at least one step of the commutation sequence, then, the values may represent changes in current through the windings of a respective pair of phases during the respective on and off-times or measurements proportional thereto.

As also shown in FIG. 6, the operations may include calculating an inductance of the motor as a function of the values and a supply voltage to the motor, as shown at block 28. For example, the inductance L of the motor may be calculated according to the following:

$$L = \frac{2V_{DC}}{\left(\left|\frac{di}{dt}\right| + \left|\frac{di_1}{dt_1}\right|\right)}$$

in which $$\frac{di}{dt} \text{ and } \frac{di_1}{dt_1}$$

represent the changes in current during the respective on and off-times, and $V_{DC}$ represents the supply voltage to the motor.

As further shown, the operations may also include determining a position of the rotor based on the inductance of the motor, and controlling operation of the motor based on the position of the rotor, as shown in blocks 30 and 32. And in one example, the position of the rotor may be more selectively determined based on the inductance of the motor, or a back electromotive force generated in the motor, based on a speed of the motor.

To further illustrate example embodiments of the present invention, consider an instance in which the BLDC motor 12 has 0 RPM (revolutions per minute), with the controller configured to implement PWM control with a 50% duty cycle and a dead time of 300 ns. Also consider that the voltage to the inverter $V_{DC}$=30 V, and the AB phase-winding pair has an inductance $L_{AB}$=22.6 µH, resistance $R_{AB}$=0.28 Ohms and back EMF $e_{AB}$=0 V. In this example, as shown in the graph of FIG. 7, the controller 18 may measure the supply voltage $V_{DC}$, and receive or otherwise calculate the following current-change measurements:

$$\frac{di}{dt} = 1326747.7 \text{ A/s and } \frac{di_1}{dt_1} = -1327599.3 \text{ A/s}.$$

The controller may then calculate the phase-winding inductance according to equation (6):

$$L_{AB} = \frac{2 \times 30}{(|1326747.7| + |-1327599.3|)} = 22.604 \text{ µH}$$

As can be seen in this example, the calculated inductance of 22.604 µH represents an error of only 0.02% compared to the actual inductance of 22.6 µH.

Now consider the same example but in an instance in which the motor 12 has 10 kRPM, and is subject to PWM control with a 78% duty cycle. Also in this instance, consider that the phase pair generates a back EMF $e_{AB}$=10 V (10 kRPM). In this example, as shown in the graph of FIG. 8, the controller 18 may measure the supply voltage $V_{DC}$, and receive or otherwise calculate the following current-change measurements:

$$\frac{di}{dt} = 641326.2 \text{ A/s and } \frac{di_1}{dt_1} = -2021631.0 \text{ A/s}.$$

The controller may then calculate the phase-winding inductance according to equation (6):

$$L_{AB} = \frac{2 \times 30}{(|641326.2| + |-2021631.0|)} = 22.54 \text{ μH}$$

As can be seen in this instance, the calculated inductance of 22.54 μH represents an error of only −0.266% compared to the actual inductance of 22.6 μH.

As will be appreciated, the apparatus of example embodiments of the present invention may be applied in any of a number of different contexts. For an example of one suitable context, see U.S. Pat. No. 7,963,442 in which the apparatus may be used to control one or more motors such as those described as the roll motor generator (RMG), divert motor (DM) or the like. The content of the '442 patent is hereby incorporated by reference in its entirety.

According to one aspect of the example embodiments of present invention, functions performed by the controller 18, such as those illustrated by the flowchart of FIG. 6, may be performed by various means. It will be understood that each block or operation of the flowchart, and/or combinations of blocks or operations in the flowchart, can be implemented by various means. Means for implementing the blocks or operations of the flowchart, combinations of the blocks or operations in the flowchart, or other functionality of example embodiments of the present invention described herein may include hardware, alone or under direction of one or more computer program code instructions, program instructions or executable computer-readable program code instructions from a computer-readable storage medium. In this regard, program code instructions may be stored on a memory device and executed by a processor, such as the controller 18 of the example apparatus 10. As will be appreciated, any such program code instructions may be loaded onto a controller or other programmable apparatus to form a computer-readable storage medium to produce a particular machine, such that the particular machine becomes a means for implementing the functions specified in the flowchart's block(s) or operation(s). These program code instructions may also be stored in a computer-readable storage medium that can direct a controller or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowchart's block(s) or operation(s). The program code instructions may be retrieved from a computer-readable storage medium and loaded into a controller or other programmable apparatus to configure the controller or other programmable apparatus to execute operations to be performed on or by the controller or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the controller or other programmable apparatus provide operations for implementing the functions specified in the flowchart's block(s) or operation(s).

Accordingly, execution of instructions associated with the blocks or operations of the flowchart by a controller, or storage of instructions associated with the blocks or operations of the flowchart in a computer-readable storage medium, supports combinations of operations for performing the specified functions. It will also be understood that one or more blocks or operations of the flowchart, and combinations of blocks or operations in the flowchart, may be implemented by special purpose hardware-based computer systems and/or controllers which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. An apparatus comprising:
   a controller configured to control operation of a salient-type, multiphase motor in accordance with a technique including periodic on and off-times, the motor including a stator and a rotor,
   wherein the controller is configured to receive, as values, measurements proportional to changes in current to the motor during the respective on and off-times, the measurements being of voltages from a differentiator circuit, and calculate an inductance of the motor as a function of the values and a supply voltage to the motor, and
   wherein the controller is configured to determine a position of the rotor based on the inductance of the motor, and control the operation of the motor based on the position of the rotor.

2. The apparatus of claim 1, wherein the controller is configured to selectively determine the position of the rotor based on the inductance of the motor, or a back electromotive force generated in the motor, based on a speed of the motor.

3. The apparatus of claim 1, wherein the stator includes a plurality of windings for a plurality of phases of the motor,
   wherein the controller is configured to control operation of the motor according to a commutation sequence including a plurality of steps each of which include periodic on and off-times, and during each of which the windings of a pair of the phases of the motor are energized, and wherein during at least one step of the commutation sequence, the values represent changes in current through the windings of a respective pair of phases during the respective on and off-times or measurements proportional thereto.

4. The apparatus of claim 1, wherein the controller is configured to control operation of the motor in accordance with a pulse width modulation (PWM) technique including periodic PWM high and low-times corresponding to the periodic on and off-times, and wherein the controller is configured to calculate the values representing changes in current during the respective PWM high and low-times.

5. The apparatus of claim 4, wherein the controller is configured to control operation of the motor in accordance with the PWM technique including the controller being configured to receive measurements of current to the motor during the respective PWM high and low-times, wherein the controller is further configured to receive second measurements of current to the motor during the respective PWM high and low-times, and calculate the changes in current to the motor during the respective PWM high and low-times as function of the measurements and second measurements.

6. The apparatus of claim 1, wherein the controller is configured to calculate the inductance L of the motor according to the following:

$$L = \frac{2V_{DC}}{\left(\left|\frac{di}{dt}\right| + \left|\frac{di_1}{dt_1}\right|\right)}$$

in which $$\frac{di}{dt} \text{ and } \frac{di_1}{dt_1}$$

represent the changes in current during the respective on and off-times, and $V_{DC}$ represents the supply voltage to the motor.

7. The apparatus of claim 1, wherein the controller is configured to receive a sample from the differentiator for each high-time and low-time, the sample being one of the received values.

8. A method comprising:
controlling operation of a salient-type, multiphase motor in accordance with a technique including periodic on and off-times, the motor including a stator and a rotor;
receiving, as values, measurements proportional to changes in current to the motor during the respective on and off-times, the measurements being of voltages from a differentiator circuit, and calculating an inductance of the motor as a function of the values and a supply voltage to the motor; and
determining a position of the rotor based on the inductance of the motor, and controlling the operation of the motor based on the position of the rotor.

9. The method of claim 8, wherein determining the position of the rotor comprises selectively determining the position of the rotor based on the inductance of the motor, or a back electromotive force generated in the motor, based on a speed of the motor.

10. The method of claim 8, wherein the stator includes a plurality of windings for a plurality of phases of the motor, wherein operation of the motor is controlled according to a commutation sequence including a plurality of steps each of which include periodic on and off-times, and during each of which the windings of a pair of the phases of the motor are energized, and wherein during at least one step of the commutation sequence, the values represent changes in current through the windings of a respective pair of phases during the respective on and off-times or measurements proportional thereto.

11. The method of claim 8, wherein operation of the motor is controlled in accordance with a pulse width modulation (PWM) technique including periodic PWM high and low-times corresponding to the periodic on and off-times, and wherein calculating or receiving values comprises calculating the values representing changes in current during the respective PWM high and low-times.

12. The method of claim 11, wherein operation of the motor is controlled in accordance with the PWM technique including receiving measurements of current to the motor during the respective PWM high and low-times, wherein the method further comprises receiving second measurements of current to the motor during the respective PWM high and low-times, and wherein calculating the values comprises calculating the changes in current to the motor during the respective PWM high and low-times as function of the measurements and second measurements.

13. The method of claim 8, wherein calculating the inductance comprises calculating the inductance L of the motor according to the following:

$$L = \frac{2V_{DC}}{\left(\left|\frac{di}{dt}\right| + \left|\frac{di_1}{dt_1}\right|\right)}$$

in which $$\frac{di}{dt} \text{ and } \frac{di_1}{dt_1}$$

represent the changes in current during the respective on and off-times, and $V_{DC}$ represents the supply voltage to the motor.

14. The method of claim 8, further comprises receiving a sample from the differentiator for each high-time and low-time, the sample being one of the received values.

15. A computer-readable storage medium for controlling operation of a salient-type, multiphase motor in accordance with a technique including periodic on and off-times, the motor including a stator and a rotor, the computer-readable storage medium having computer-readable program code portions stored therein, the computer-readable program portions comprising:

a first executable portion configured to calculate or receive, as values, measurements proportional to changes in current to the motor during the respective on and off-times, the measurements being of voltages from a differentiator circuit, and calculate an inductance of the motor as a function of the values and a supply voltage to the motor; and a second executable portion configured to determine a position of the rotor based on the inductance of the motor to thereby permit controlling operation of the motor based on the position of the rotor.

16. The computer-readable storage medium of claim 15, wherein the second executable portion is configured to selectively determine the position of the rotor based on the inductance of the motor, or a back electromotive force generated in the motor, based on a speed of the motor.

17. The computer-readable storage medium of claim 15, wherein the stator includes a plurality of windings for a plurality of phases of the motor,
   wherein operation of the motor is controlled according to a commutation sequence including a plurality of steps each of which include periodic on and off-times, and during each of which the windings of a pair of the phases of the motor are energized, and
   wherein during at least one step of the commutation sequence, the values represent changes in current through the windings of a respective pair of phases during the respective on and off-times or measurements proportional thereto.

18. The computer-readable storage medium of claim 15, wherein operation of the motor is controlled in accordance with a pulse width modulation (PWM) technique including periodic PWM high and low-times corresponding to the periodic on and off-times, and wherein the first executable portion is configured to calculate the values representing changes in current during the respective PWM high and low-times.

19. The computer-readable storage medium of claim 18, wherein operation of the motor is controlled in accordance with the PWM technique including receiving measurements of current to the motor during the respective PWM high and low-times,
   wherein the computer-readable program portions further comprise a third executable portion configured to receive the measurements and second measurements of current to the motor during the respective PWM high and low-times, and
   wherein the first executable portion is configured to calculate the values comprises calculating the changes in current to the motor during the respective PWM high and low-times as function of the measurements and second measurements.

20. The computer-readable storage medium of claim 15, wherein the first executable portion is configured to calculate the inductance comprises calculating the inductance L of the motor according to the following:

$$L = \frac{2V_{DC}}{\left(\left|\frac{di}{dt}\right| + \left|\frac{di_1}{dt_1}\right|\right)}$$

in which $$\frac{di}{dt} \text{ and } \frac{di_1}{dt_1}$$

represent the changes in current during the respective on and off-times, and $V_{DC}$ represents the supply voltage to the motor.

21. The computer-readable storage medium of claim 15, wherein the first executable portion is configured to receive a sample from the differentiator for each high-time and low-time, the sample being one of the received values.

* * * * *